USOO8376371B2

(12) United States Patent
Young et al.

(10) Patent No.: US 8,376,371 B2
(45) Date of Patent: Feb. 19, 2013

(54) LOCKING CHUCK JAWS

(75) Inventors: Gary L. Young, Six Mile, SC (US); Barry G. Massey, Seneca, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 884 days.

(21) Appl. No.: 12/212,138

(22) Filed: Sep. 17, 2008

(65) Prior Publication Data
US 2010/0066038 A1 Mar. 18, 2010

(51) Int. Cl.
*B23B 31/16* (2006.01)

(52) U.S. Cl. ............................ 279/62; 279/60; 279/123

(58) Field of Classification Search .................. 279/60, 279/61, 62, 63, 64, 65, 123, 55, 152, 154
See application file for complete search history.

(56) References Cited

U.S. PATENT DOCUMENTS

| | | | |
|---|---|---|---|
| 573,189 A | 12/1896 | Vogel | |
| 1,894,515 A | 1/1933 | Hubbell | |
| 2,546,351 A * | 3/1951 | Stoner | 279/33 |
| 3,558,146 A * | 1/1971 | Mayers et al. | 279/28 |
| 4,213,623 A | 7/1980 | Rohm | |
| 4,302,021 A | 11/1981 | Rohm | |
| 4,536,109 A * | 8/1985 | Hunger et al. | 408/240 |
| 4,583,751 A | 4/1986 | Rohm | |
| 4,586,859 A * | 5/1986 | Rohm | 408/240 |
| 4,726,719 A * | 2/1988 | Mack | 408/240 |
| 4,752,165 A * | 6/1988 | Wanner | 408/239 R |
| 4,840,387 A | 6/1989 | McCarthy | |
| 4,840,519 A * | 6/1989 | Kleine | 408/226 |
| 5,044,643 A | 9/1991 | Nakamura | |
| 5,125,673 A | 6/1992 | Huff et al. | |
| 5,145,192 A | 9/1992 | Rohm | |
| 5,145,193 A | 9/1992 | Rohm | |
| 5,172,923 A | 12/1992 | Nakamura | |
| 5,215,317 A | 6/1993 | Jordan et al. | |
| 5,232,230 A | 8/1993 | Lin | |
| 5,234,223 A | 8/1993 | Sakamaki | |
| 5,261,679 A | 11/1993 | Nakamura | |
| 5,322,303 A | 6/1994 | Nakamura | |

(Continued)

FOREIGN PATENT DOCUMENTS

| | | | |
|---|---|---|---|
| DE | 3604927 A1 * | 8/1987 | |
| DE | 19506708 | 3/1996 | |

(Continued)

OTHER PUBLICATIONS

UK Examiner's Search Report regarding co-pending application GB0915131.7, dated Nov. 16, 2009.

(Continued)

*Primary Examiner* — Daniel Howell
*Assistant Examiner* — Paul M Janeski
(74) *Attorney, Agent, or Firm* — Nelson Mullins Riley & Scarborough, LLP

(57) ABSTRACT

A jaw for use in a drill chuck having a longitudinal center axis, comprising a chuck body which includes a jaw face formed on an inner surface of the chuck body and a plurality of teeth formed on an outer surface of the chuck body, the jaw face being substantially parallel to the longitudinal center axis. A ridge depends inwardly from the jaw face toward the longitudinal center axis. The ridge includes a tool engaging surface that is substantially parallel to the longitudinal center axis and has a width of between 0.020 to 0.060 inches.

15 Claims, 11 Drawing Sheets

U.S. PATENT DOCUMENTS

| | | | |
|---|---|---|---|
| 5,348,317 A | 9/1994 | Steadings et al. | |
| 5,348,318 A | 9/1994 | Steadings et al. | |
| 5,411,275 A | 5/1995 | Huff et al. | |
| 5,431,419 A | 7/1995 | Mack | |
| 5,458,345 A | 10/1995 | Amyot | |
| 5,466,101 A * | 11/1995 | Meyen | 408/226 |
| 5,499,829 A | 3/1996 | Rohm | |
| 5,499,830 A | 3/1996 | Schnizler | |
| 5,501,473 A | 3/1996 | Barton et al. | |
| 5,580,197 A * | 12/1996 | Rohm | 408/240 |
| 5,615,899 A | 4/1997 | Sakamaki | |
| 5,741,016 A | 4/1998 | Barton et al. | |
| 5,775,704 A | 7/1998 | Wilson et al. | |
| 5,816,582 A | 10/1998 | Steadings et al. | |
| 5,816,583 A | 10/1998 | Middleton | |
| 5,826,888 A | 10/1998 | Weaver et al. | |
| 5,829,761 A | 11/1998 | Rohm | |
| 5,882,153 A | 3/1999 | Mack et al. | |
| 5,913,524 A | 6/1999 | Barton | |
| 5,957,469 A | 9/1999 | Miles et al. | |
| 6,022,029 A | 2/2000 | Sakamaki | |
| 6,168,170 B1 * | 1/2001 | Miles et al. | 279/62 |
| 6,227,549 B1 * | 5/2001 | Michel | 279/60 |
| 6,260,856 B1 | 7/2001 | Temple-Wilson | |
| 6,648,341 B1 * | 11/2003 | Gaddis et al. | 279/60 |
| 2003/0066390 A1 * | 4/2003 | Mack | 76/101.1 |
| 2007/0069483 A1 * | 3/2007 | Bordeianu et al. | 279/62 |
| 2007/0152407 A1 * | 7/2007 | Mack | 279/60 |
| 2008/0309029 A1 * | 12/2008 | Bodine et al. | 279/60 |

FOREIGN PATENT DOCUMENTS

| | | | |
|---|---|---|---|
| DE | 29600727 | | 4/1996 |
| DE | 4438991 | | 5/1996 |
| EP | 0519412 | | 12/1992 |
| EP | 0618029 | | 10/1994 |
| EP | 0677348 | | 10/1995 |
| EP | 0710518 | | 5/1996 |
| EP | 0710519 | | 5/1996 |
| EP | 0710520 | | 5/1996 |
| FR | 002645056 | | 10/1990 |
| GB | 2030485 A | * | 4/1980 |
| JP | 4365504 | | 12/1992 |
| WO | 2005/077577 | | 8/2005 |
| WO | 2006/097637 | | 9/2006 |
| WO | 2008/150456 | | 12/2008 |

OTHER PUBLICATIONS

UK Office Action dated Feb. 7, 2012, regarding co-pending application GB0915131.7.

Office Action dated Oct. 19, 2011 for co-pending Chinese Patent Application No. 200910174751.4.

Response dated Apr. 4, 2012 to UK Office Action, regarding co-pending application GB0915131.7.

Second Office Action dated Aug. 28, 2012 for co-pending Chinese Patent Application No. 200910174751.4.

\* cited by examiner

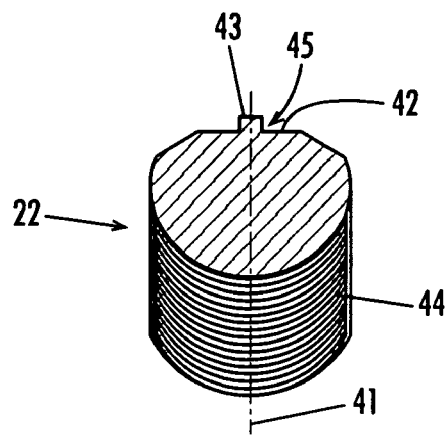
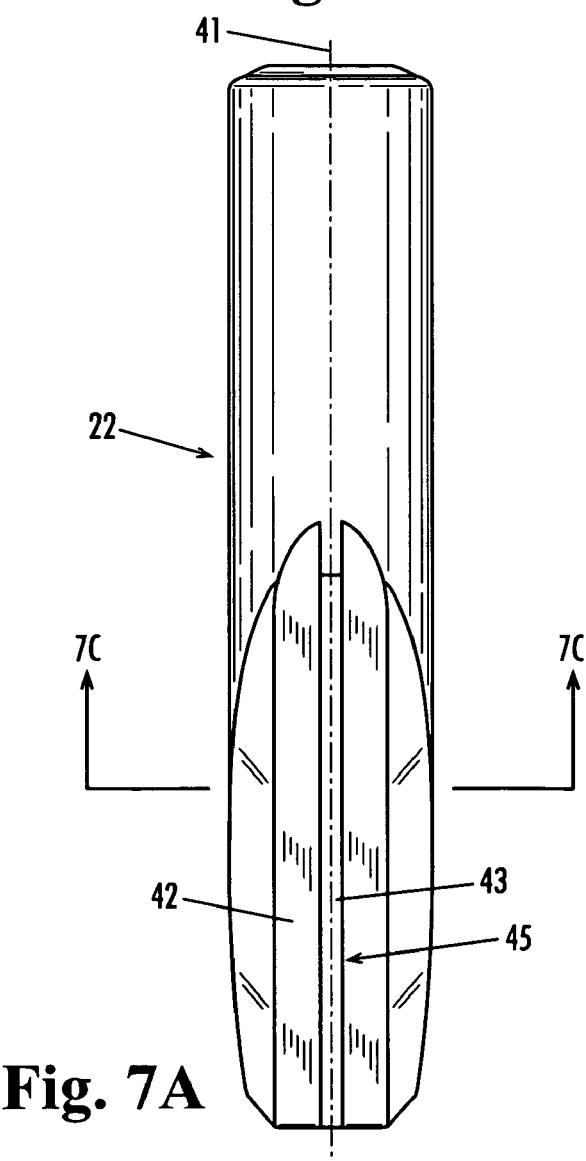
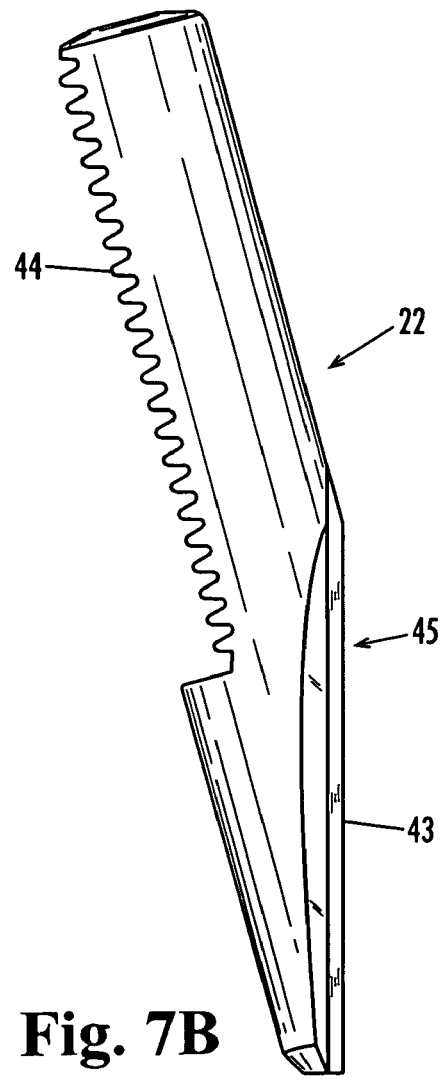
Fig. 7C
Fig. 7A
Fig. 7B

LOCKING CHUCK JAWS

BACKGROUND OF THE INVENTION

The present invention relates generally to chucks for use with drills or with electric or pneumatic power drivers. More particularly, the present invention relates to jaws for use with such chucks.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

As noted above, drill bits typically have shanks that are either cylindrical or of a polygonal cross section. Typically, for those applications wherein a large diameter accessory on the end of the drill bit is required, the drill bit shank will be of a polygonal cross section to help provide a more secure hold of the drill bit by the jaws of the chuck. For example, self-feeding drill bits and drill bits used to create conduits through joists for piping and electrical wiring often have polygonal shanks.

A typical jaw face configuration for holding such drill bits in a standard quarter-inch chuck is shown in FIG. 1. Each jaw face includes one or more teeth that meet at a pointed apex for engaging a flat sidewall 53 of the polygonal drill bit shank 51. During drilling operations, it is possible for torque exerted on the drill bit to cause shank 51 to work back and forth within the jaws, thereby developing a looseness. Continued drilling operations in this condition often leads to the apexes of the jaw teeth disrupting material on the shank of the drill bit. Eventually, the shank of the drill bit is destroyed and the drill bit can no longer be used.

Another known jaw face configuration is shown in FIG. 2. In order to prevent damage to shank 51 of the drill bit, each jaw face is planar over the width of the corresponding sidewall 53 it engages. As such, the jaw face does not disrupt the material of the shank. However, because the width of each jaw face is approximately equal to the width of the corresponding shank sidewall, during drilling operations, it is not uncommon for the torque exerted on the drill bit to cause the jaws to rotate within their respective jaw passageways. Such rotation may cause the jaws to become so tight on shank 51 of the drill bit that the user cannot loosen the chuck without excessive force.

The present invention recognizes and addresses the foregoing considerations, and others, of prior art constructions and methods.

SUMMARY OF THE INVENTION

One embodiment of the present invention provides a jaw for use in a drill chuck having a longitudinal center axis, including a chuck body having a jaw face formed on an inner surface of the chuck body and a plurality of teeth formed on an outer surface of the chuck body. The jaw face is substantially parallel to the longitudinal center axis and a ridge depends inwardly from the jaw face toward the longitudinal center axis. The ridge includes a tool engaging surface that is substantially parallel to the longitudinal center axis and has a width of between 0.020 to 0.060 inches.

Another embodiment of the present invention provides a jaw for use in a drill chuck having a longitudinal center axis, including a chuck body having a jaw face formed on an inner surface of the chuck body and a plurality of teeth formed on an outer surface of the chuck body. The jaw face is substantially parallel to the longitudinal center axis and a ridge depends inwardly from the jaw face toward the longitudinal center axis. The ridge includes a tool engaging surface that is planar and is parallel to the longitudinal center axis.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIGS. 7A, 7B and 7C are a front, a side and a cross-sectional view, taken along line 7C-7C of FIG. 7A, of the chuck jaw of the chuck as shown in FIG. 3;

Figure 1:
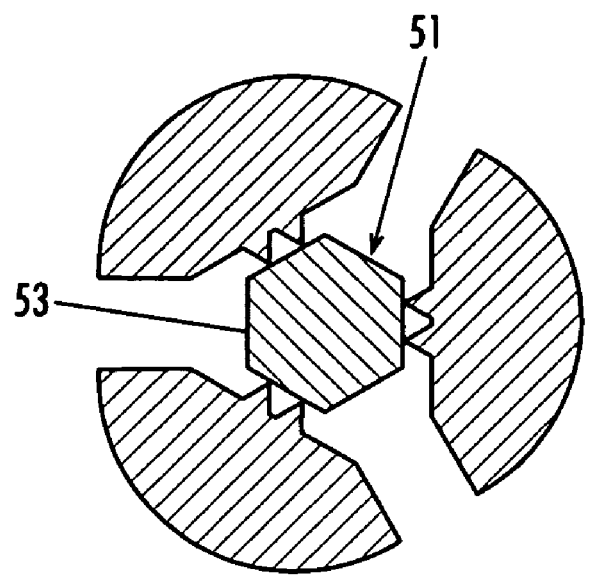
FIG. 1 is a cross-sectional view of a set of prior art jaws engaging a shank of a drill bit.
Figure 2:
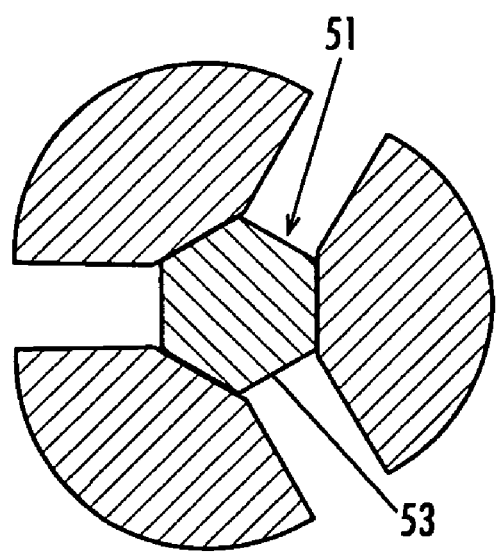
FIG. 2 is a cross-sectional view of a set of prior art jaws engaging a shank of a drill bit.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents Referring to FIGS. 3 and 4, a chuck 10 includes a body 14, a nut 16, a front sleeve 18, a nose piece 20 and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Figure 5:
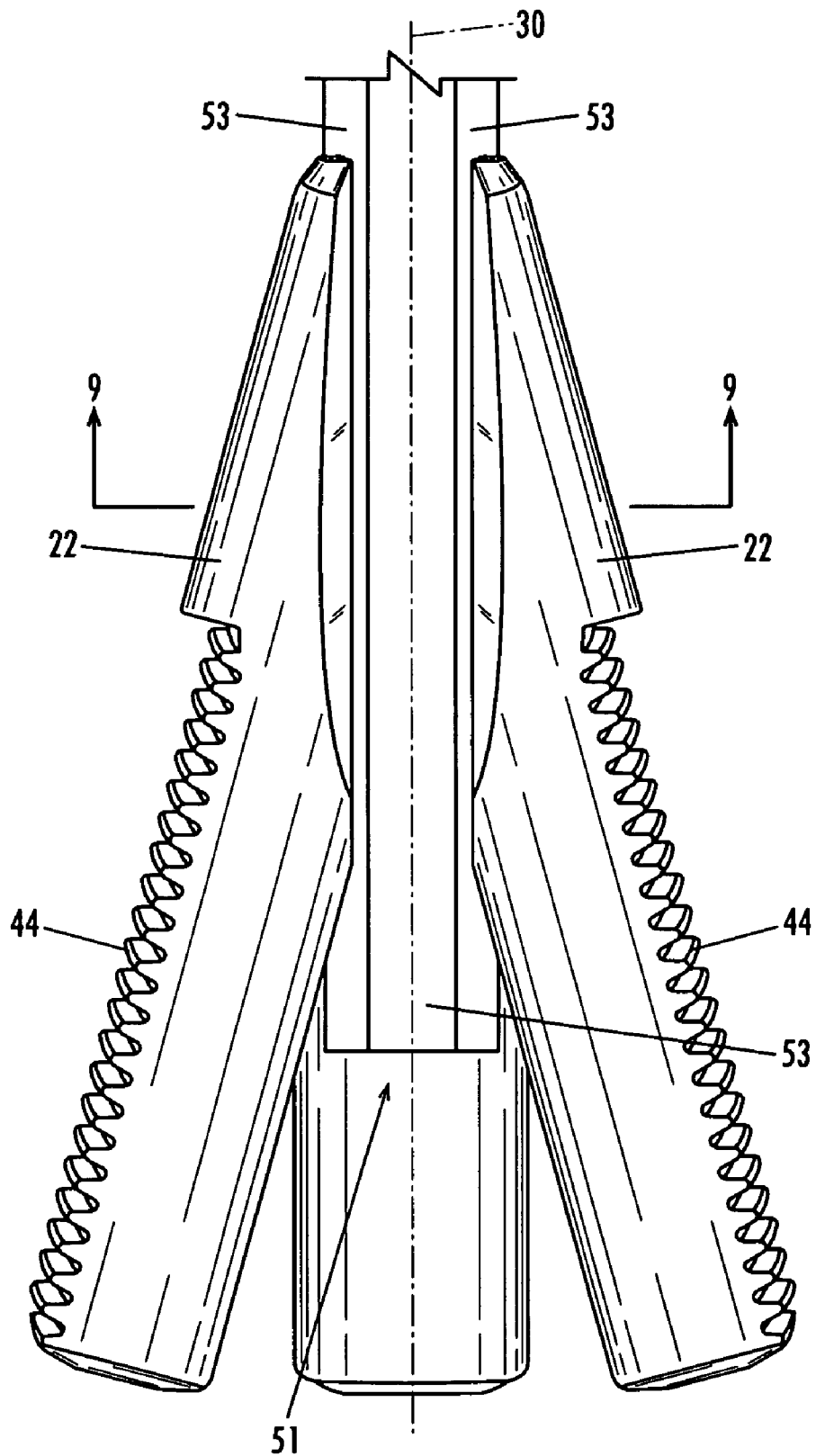
FIG. 5 is a side view of the plurality of chuck jaws of the chuck as shown in FIG. 3, engaging a shank of a drill bit.
Figure 6:
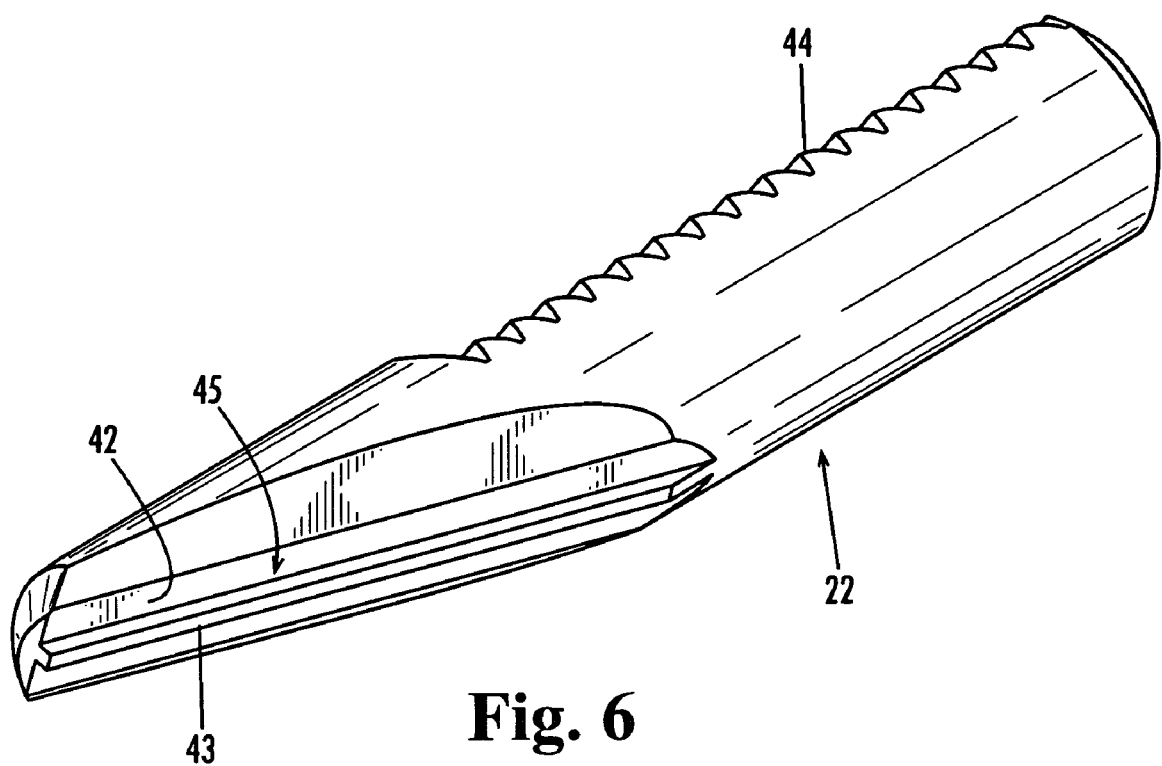
FIG. 6 is a perspective view of the chuck jaw of the chuck as shown in FIG. 3.
Figure 8:
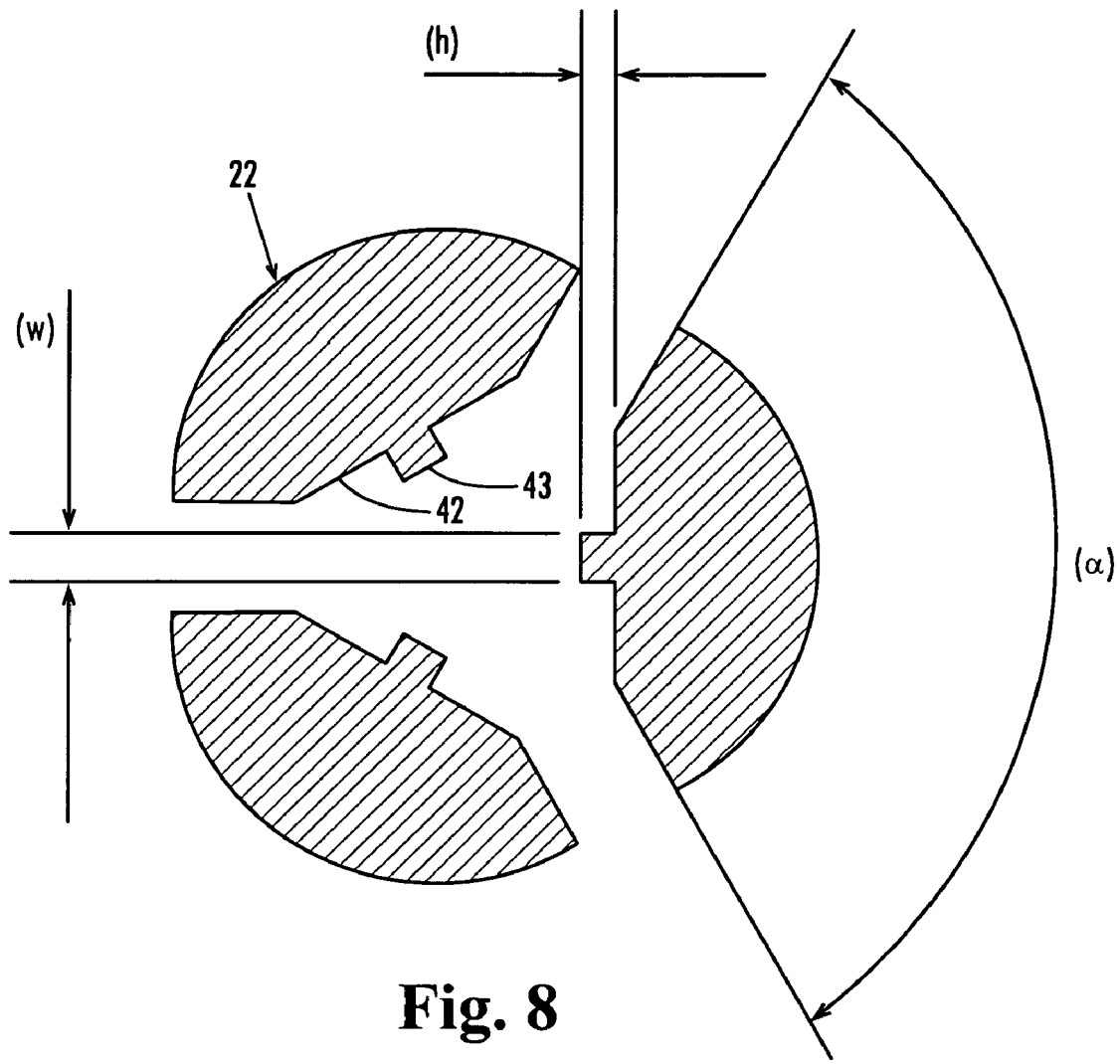
FIG. 8 is a cross-sectional view of the plurality of chuck jaws of the chuck as shown in FIG. 3.

Body 14 defines three passageways 40 to accommodate three jaws 22. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip a shank 51 of a tool, as shown in FIG. 5.

Figure 9:
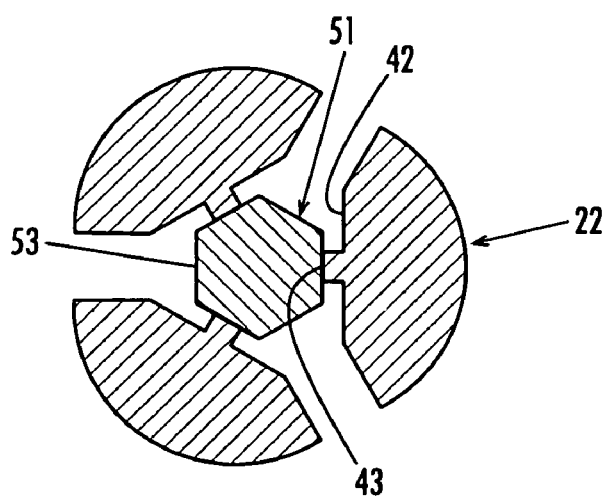
FIG. 9 is a cross-sectional view of the plurality of chucks engaging the shank, a drill bit, taken along line 9-9 of FIG. 5.

As best seen in FIGS. 5 through 8, each jaw 22 has a substantially planar face 42 that is generally parallel to central axis 30 of chuck body 14. Threads 44 are formed on the jaws opposite or outer surface, and may be constructed in any suitable type and pitch. A ridge 45 depends outwardly from, and extends along, face 42 of each jaw 22. In the preferred embodiments shown, ridge 45 is symmetrical about a central symmetry plane 41 of jaw 22, wherein the central symmetry planes of each jaw 22 intersect along longitudinal center axis 30 of chuck body 14. Each ridge 45 includes a substantially planar tool engaging surface 43 that is parallel to the longitudinal center axis of chuck body 14. For the preferred embodiment shown, in which the plurality of jaws 22 is used in a quarter-inch drill chuck for receiving quarter-inch or less drill bits, the width (w) of each tool engaging surface 43 is from 0.020 to 0.060 inches and the height (h) is within the range of 0.010 to 0.030 inches. Most preferably, the width (w) of tool engaging surface 43 of each jaw 22 is approximately 0.032 inches, and the height approximately 0.010 inches, when the jaws are used to secure a shank 51 of a quarter-inch or less drill bit. As best seen in FIG. 9, the tool engaging surfaces 43 of the disclosed jaws 22 are more narrow than the corresponding sides 53 of the polygonally shaped shank 51 of the secured drill bit. As such, the width (w) of the tool engaging surfaces assists in preventing the disruption of the material of shank 51, while at the same time helps reduce the likelihood that the jaws will be adversely rotated within their corresponding passageways.

Figure 3:
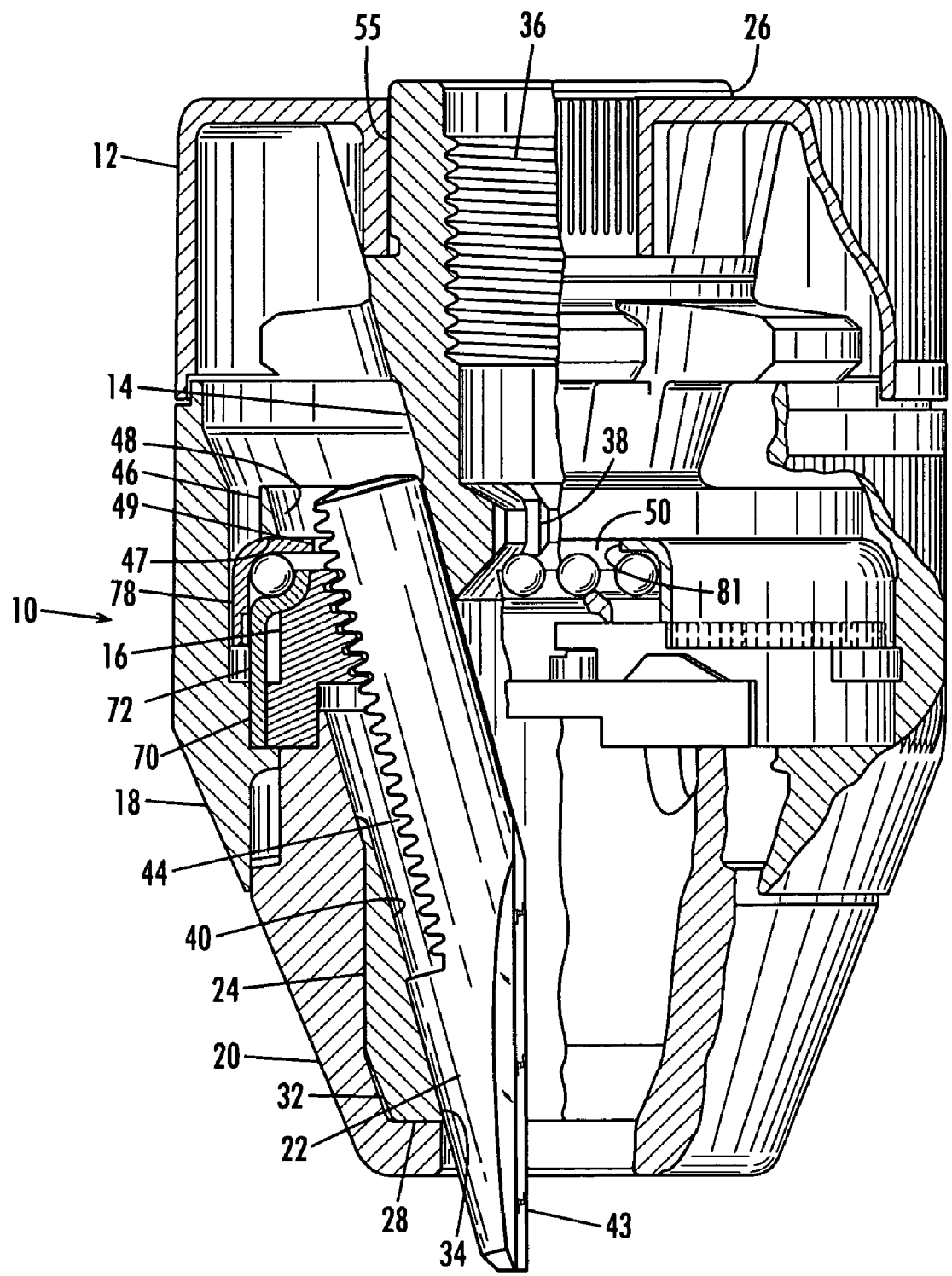
FIG. 3 is a longitudinal view, partly in section, of a chuck including a plurality of jaws in accordance with an embodiment of the present invention.
Figure 4:
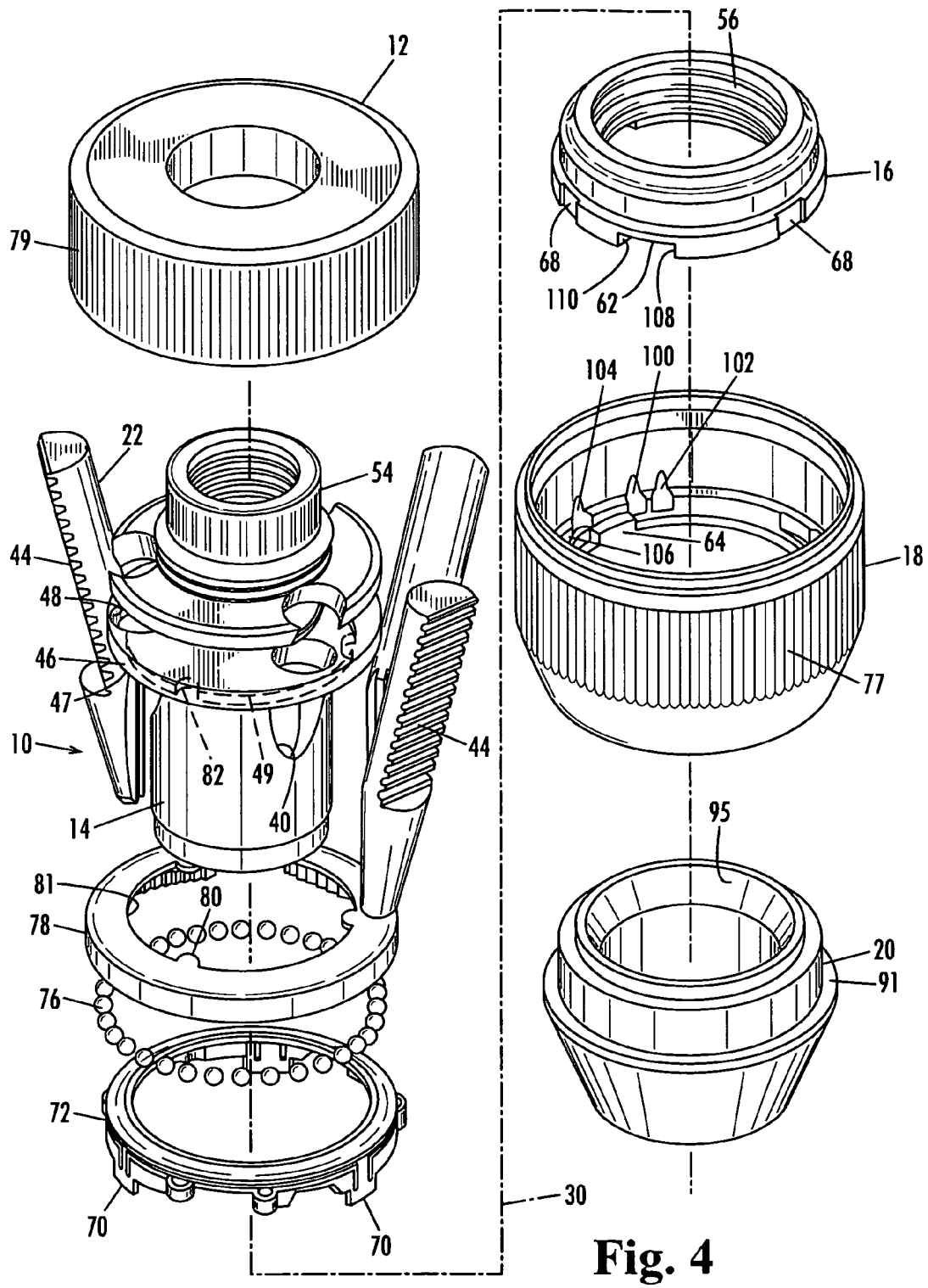
FIG. 4 is an exploded view of the chuck as shown in FIG. 3.

As illustrated in FIGS. 3 and 4, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing assembly as described below. Ledge portion 50 includes a first surface 47 and a second surface 49. First surface 47 extends radially outwardly, and is perpendicular to, longitudinal center axis 30 of the chuck body. Second surface 49 extends axially along, and is concentric about, longitudinal center axis 30 of the chuck body.

Body tail section 26 includes a knurled surface 54 that receives an optional rear sleeve 12 in a press fit at 55. Rear sleeve 12 could also be retained by press fit without knurling, by use of a key or by crimping, staking, riveting, threading or any other suitable securing mechanism. Further, the chuck may be constructed with a single sleeve having no rear sleeve.

Nose piece 20 retains nut 16 against forward axial movement. The nose piece is press fit to body nose section 24. It should be understood, however, that other methods of axially securing the nut on the body may be used. For example, the nut may be a two-piece nut held on the body within a circumferential groove on the outer circumference of the body. Nose piece 20 may be coated with a non-ferrous metallic coating to prevent rust and to enhance its appearance. Examples of suitable coatings include zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 79 if desired.

Front sleeve 18 is secured from movement in the forward axial direction by an annular shoulder 91 on nose piece 20. A frustoconical section 95 at the rearward end of the nose piece facilitates movement of jaws 22 within the chuck.

The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck of the present invention are fabricated will depend on the end use of the chuck, and the above materials are provided by way of example only.

Nut 16 has threads 56 for mating with jaw threads 44. Nut 16 is positioned about the body in engagement with the jaw threads so that when the nut is rotated with respect to body 14, the jaws will be advanced or retracted depending on the nut's rotational direction.

Figure 10:
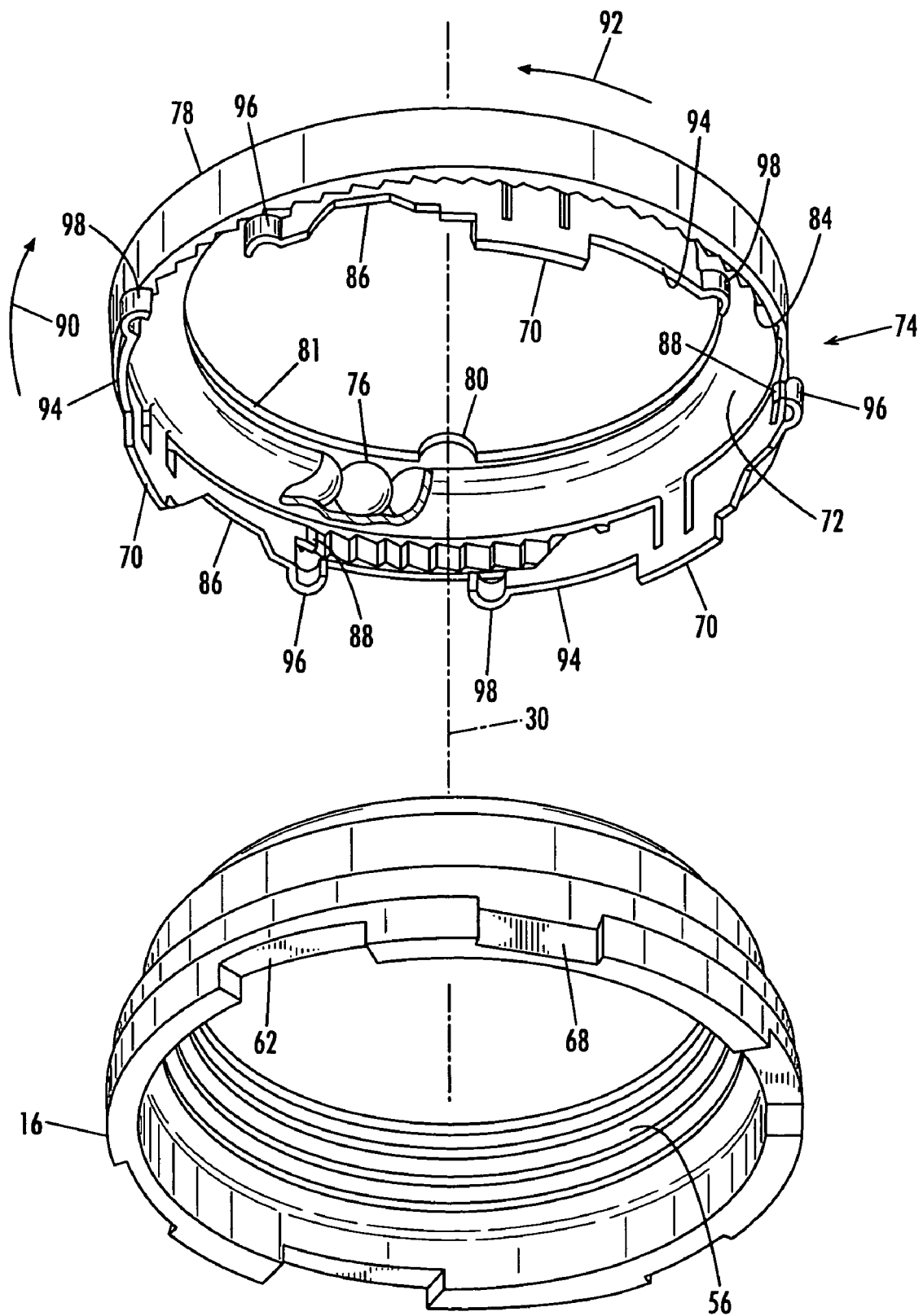
FIG. 10 is an exploded view of the bearing and nut of the chuck as shown in FIG. 3.

As illustrated in FIG. 10, the nut's forward axial face includes recesses 62 that receive respective drive dogs 64 (FIG. 4) extending from the inner surface of front sleeve 18. The angular width of the drive dogs is less than that of the recesses, resulting in a slight range of relative rotational movement, for example between 6° and 10°, between the nut and the front sleeve.

Nut 16 also defines a plurality of grooves formed as flats 68 about the nut's outer circumference. Flats 68 receive respective tabs 70 extending forward from an inner race 72 of a bearing assembly 74. The engagement of tabs 70 and flats 68 rotationally fix the inner race to the nut, although it should be understood that there may be a slight rotational tolerance between the two.

Inner race 72 receives a plurality of bearing elements 76, in this case bearing balls, 76 disposed between it and an outer race 78 seated on thrust ring ledge 50 (FIG. 1). Outer race 78 is rotationally fixed to body 14 by a plurality of tabs 80 that extend inwardly from an inner periphery 81 of outer race 78. The plurality of tabs 80 is received in corresponding grooves 82 defined by second surface 49 of the thrust ring ledge 50.

Outer race 78 also includes a ratchet. In the illustrated embodiment, the ratchet is formed by a plurality of sawtooth-shaped teeth 84 disposed about the inner circumferential surface of the outer race. A first pawl 86 extends from one side of each tab 70 and is biased radially outward from the inner race, thereby urging a distal end 88 of each pawl 86 toward the outer race ratchet.

Each tooth 84 has a first side with a slope approaching 90°. The second side has a lesser slope. Pawl 86 is defectable and is generally disposed in alignment with the slope of the second side. Thus, rotation of inner race 72 in a direction 90 with respect to outer race 78 moves pawl distal ends 88 repeatedly over teeth 84, causing a clicking sound as ends 88 fall against each subsequent tooth's second side. This configuration of teeth 84 and pawl 86, however, prevents the inner race's rotation in an opposite direction 92. Application of rotational force to the inner race in this direction forces distal ends 88 into the steep-sloped first sides of teeth 84. Since pawl 86 is generally perpendicular to the first sides, it does not deflect inward to permit rotation.

As discussed below, direction 90 corresponds to the chuck's closing direction, while direction 92 corresponds to the chuck's opening direction. Accordingly, when pawls 86 engage ratchet teeth 84, the teeth permit the inner race's movement in the chuck's closing direction but prevent its movement in the opening direction.

A second deflectable pawl 94 extends to the other side of each tab 70. Like pawls 86, each pawl 94 is biased radially outward. Unlike pawls 86, however, pawls 94 do not engage the outer race ratchet.

Figure 11A:
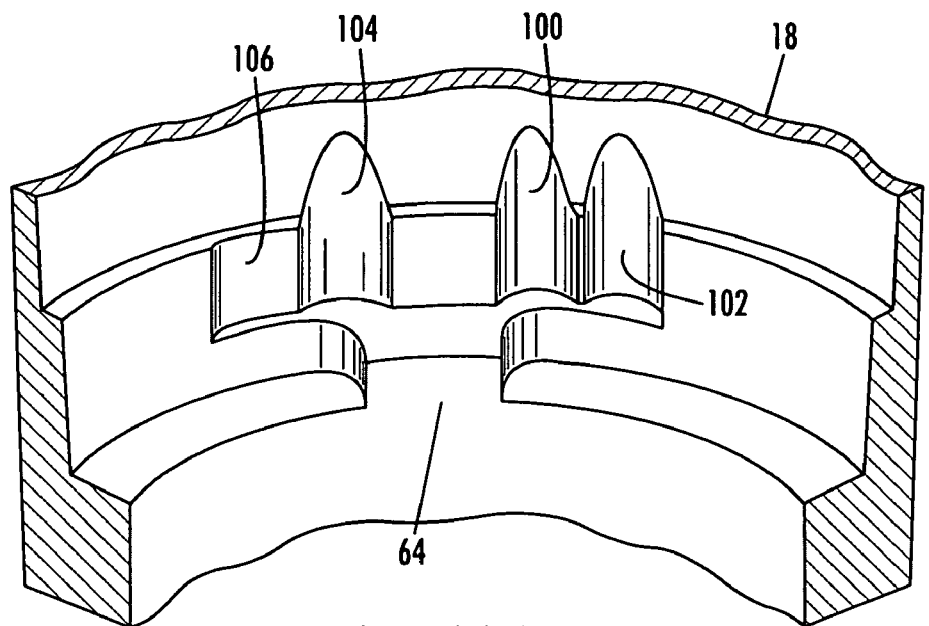
FIG. 11A is a partial perspective view of the sleeve of the chuck as shown in FIG. 3.

Pawls 86 and 94 include tabs 96 and 98 at their distal ends, respectively. Referring also to FIG. 11A, an inner circumferential surface of sleeve 18 defines first and second recesses 100 and 102. During the chuck's operation, each tab 98 is received in one of these recesses, depending on the sleeve's rotational position with respect to the nut as discussed in more detail below. The sleeve also defines a third recess 104 and a cam surface 106. Also depending on the sleeve's rotational position, each tab 96 is received either by the cam surface or by recess 104. The sleeve includes a pair of recesses 100, 102 for each tab 98 and a recess 104 and cam surface 106 for each tab 96.

Figure 11B:
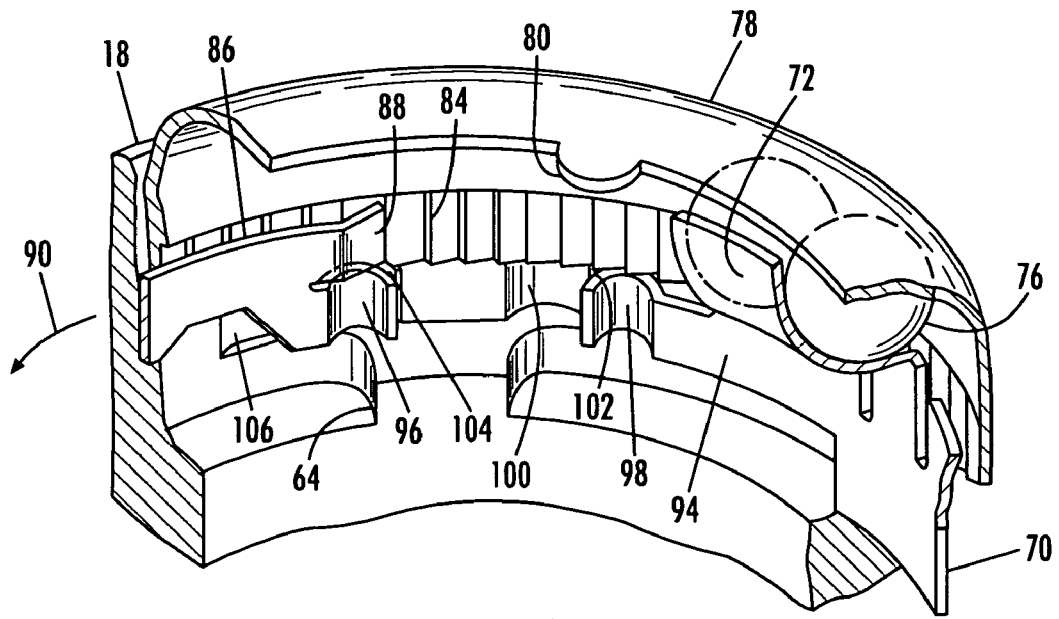
FIG. 11B is a partial perspective view of the bearing and sleeve of the chuck as shown in FIG. 3.
Figure 11C:
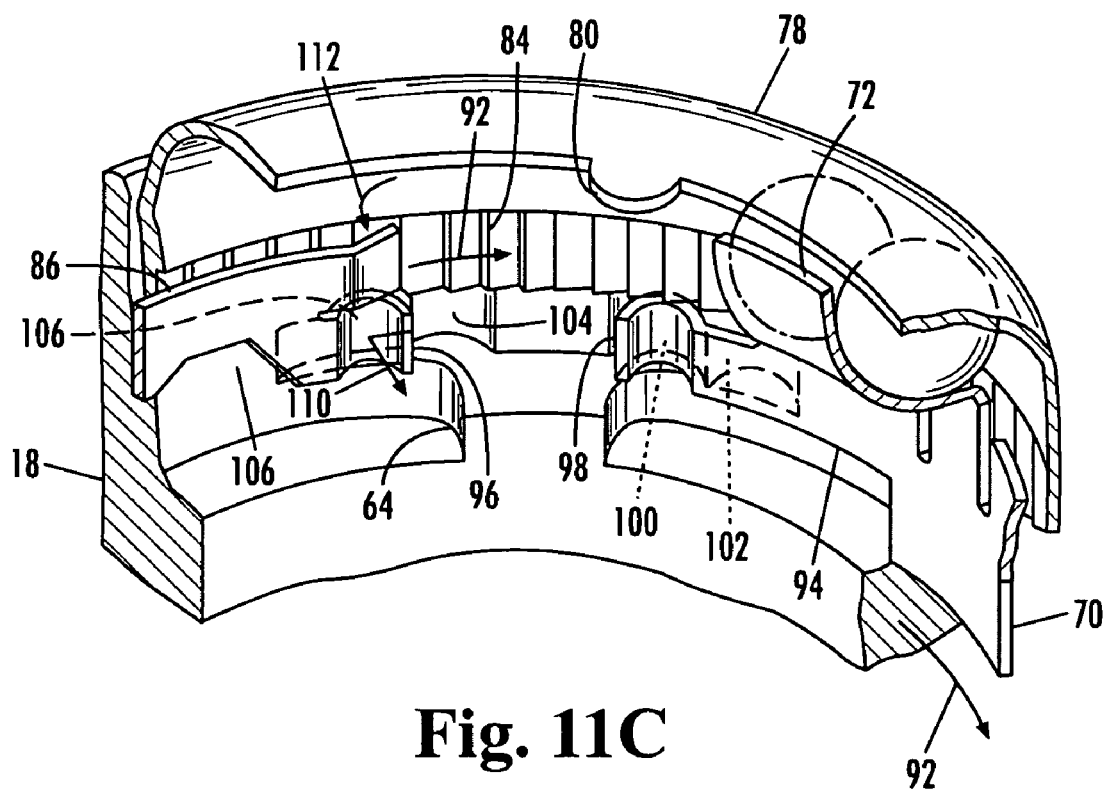
FIG. 11C is a partial perspective view of the bearing and sleeve of the chuck as shown in FIG. 3.

FIG. 11C illustrates the disposition of pawls 86 and 94 when sleeve 18 is in a first of two positions with respect to nut 16 (FIG. 4), while FIG. 11B illustrates these components when the sleeve is in a second position with respect to the nut. For ease of illustration, both figures omit the nut. However, referring to FIG. 4 and to the sleeve's second position as shown in FIG. 11B, each drive dog 64 is disposed against or adjacent to a side 108 of the gap 62 in which is it received. Each of the sleeve's recesses 102 receives tab 98 of one of the pawls 94, and each recess 104 receives tab 96 of one of the pawls 86. Accordingly, the distal end 88 of each pawl 86 engages ratchet teeth 84, and inner race 72 can rotate only in direction 90 with respect to outer race 78.

Referring now to FIG. 11C, when inner race 72 moves in opening direction 92 with respect to the outer race, each tab 98 moves out of its recess 102 and into its recess 100, as indicated by arrow 108. Each tab 96 rides up and out of its recess 104 onto its cam surface 106, as indicated by arrow 110. As indicated by arrow 112, this pushes each deflectable tab 86 radially inward, thereby disengaging distal ends 88 from ratchet teeth 84. Thus, the inner race is free to rotate with respect to the outer race.

As described in more detail below, when sleeve 18 rotates in direction 92 so that the inner race moves from the position shown in FIG. 11B to the position shown in FIG. 11C, drive dogs 64 move within grooves 62 of nut 16 (FIG. 4) so that each drive dog is against or immediately adjacent to a side 110 of the groove.

In operation, and referring to FIGS. 4, 10, 11B and 11C, nut grooves 62 receive drive dogs 64 when the chuck is between fully opened and fully closed positions so that the drive dogs are adjacent groove sides 110. Inner race 72 is disposed with respect to outer race 78 so that tabs 96 and 98 are received by cam surface 106 and recess 100, respectively. That is, sleeve 18 is in the first position with respect to the nut. In this condition, tabs 98 and recesses 100 rotationally fix inner race 72 to sleeve 18. Since inner race 72 is rotationally fixed to nut 16 by tabs 70 and flats 68, an operator rotating sleeve 18 rotationally drives the nut through inner race 72, thereby opening or closing the jaws. When the operator rotates the sleeve/bearing inner race/nut in the closing direction (indicated by arrow 90 in FIG. 10) to the point that the tool engaging surfaces 43 of the jaws tighten onto a tool shank, as shown in FIG. 9, the nut is urged rearward up the jaw threads, thereby pushing the nut against inner race 72, bearing elements 76, outer race 78 and thrust ring 46. The rearward force creates a frictional lock between the nut and inner race 72 that further rotationally fixes two components.

The wedge between the nut threads and the jaw threads increasingly resists the nut's rotation. When the operator continues to rotate sleeve 18, and the resistance overcomes the hold provided by tabs 98 in recesses 100, sleeve 18 rotates with respect to nut 16 and inner bearing race 72. This moves drive dogs 64 from sides 110 of grooves 62 to sides 108 and pushes tabs 98 out of recesses 100 into recesses 102. Simultaneously, cam surfaces 106 rotate away from tabs 96 so that the tabs are released into recesses 104, thereby engaging distal ends 88 of pawls 86 with ratchet teeth 84, as shown in FIG. 11B. At this point, inner race 72, and therefore nut 16, is rotationally locked to outer race 78, and therefore body 14, against rotation in the chuck's opening direction. That is, the nut is rotationally locked to the chuck body in the opening direction. Since the nut's rotation with respect to the body is necessary to open the chuck, this prevents inadvertent opening during use.

Inner race 72, and therefore nut 16, may, however, still rotate with respect to outer race 78, and therefore body 14, in the chuck's closing direction. During such rotation, sleeve 18 drives nut 16 through drive dogs 64 against groove sides 108, as well as through inner race 72. This continues to tighten the chuck and, as described above, produces a clicking sound to notify the operator that the chuck is in a fully tightened position.

To open the chuck, the operator rotates sleeve 18 in the opposite direction. Sleeve 18 transfers this torque to inner race 72 at the engagement of tabs 96 and 98 in recesses 104 and 102, respectively. Because pawls 86 engage outer race 78, which is rotationally fixed to the body, through the ratchet teeth, the inner race cannot rotate with the sleeve. Thus, upon application of sufficient torque in the opening direction, sleeve 18 moves with respect to the inner race and the nut. This moves tabs 96 back up onto cam surfaces 106, thereby disengaging pawls 86 from ratchet teeth 84. Tabs 98 move from recesses 102 into recesses 100, and drive dogs 64 move from sides 108 to sides 110 of grooves 62. Thus, the sleeve moves to its first position with respect to the nut, as shown in FIG. 11C, and the inner race and nut, are free to rotate with respect to the outer race and chuck body. Accordingly, further rotation of sleeve 18 in the opening direction moves tool engaging surfaces 43 of jaws 22 away from the chuck axis, thereby opening the chuck.

Figure 12:
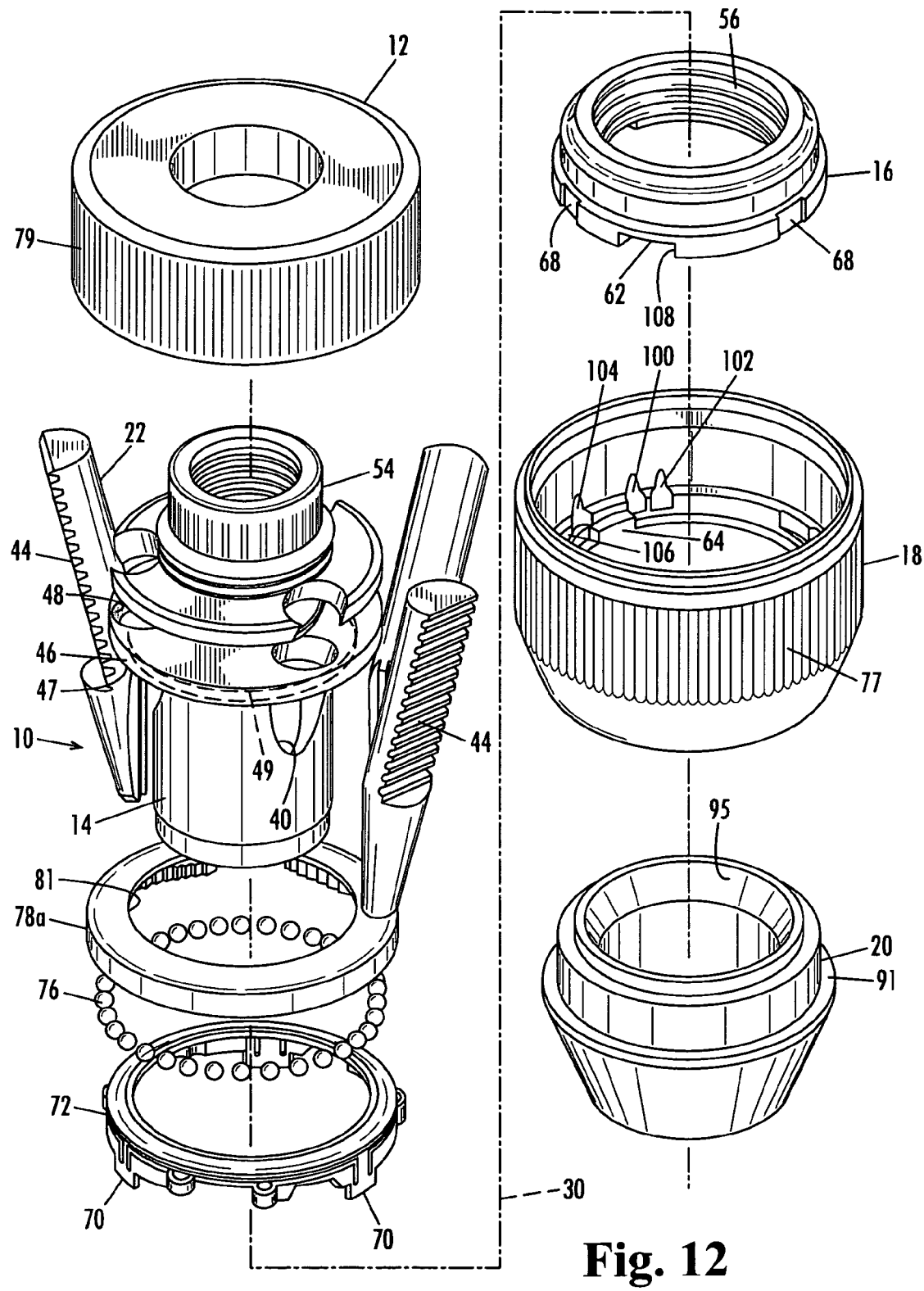
FIG. 12 is an exploded view of an alternate embodiment of a chuck including a plurality of jaws in accordance with an embodiment of the present invention.

Referring now to FIG. 12, chuck 10 is shown with alternate embodiment of an outer race 78a for use in bearing assembly 74. In contrast to the earlier described embodiment, outer race 78a does not include a plurality of tabs extending inwardly from an inner periphery 81. As well, second surface 49 of ledge portion 50 of chuck body 14 does not define a plurality of recesses. Rather than rotationally fixing outer race 78a to chuck body 14 with tabs and corresponding recesses, frictional forces are used to selectively fix outer race 78a to chuck body 14 while operating the chuck, as described below.

In operation, and referring to FIGS. 10, 11B 11C, and 12, nut grooves 62 receive drive dogs 64 when the chuck is between fully opened and fully closed positions so that the drive dogs are adjacent groove sides 110. Inner race 72 is disposed with respect to outer race 78a so that tabs 96 and 98 are received by cam surface 106 and recess 100, respectively. That is, sleeve 18 is in the first position with respect to the nut. In this condition, tabs 98 and recesses 100 rotationally fix inner race 72 to sleeve 18 and outer race 78 is free to rotate about body 14. Since inner race 72 is rotationally fixed to nut 16 by tabs 70 and flats 68, an operator rotating sleeve 18 rotationally drives the nut through inner race 72, thereby opening or closing jaws 22. When the operator rotates the sleeve/bearing inner race/nut in the closing direction (indicated by arrow 90 in FIG. 10) to the point that tool engaging surfaces 43 of jaws 22 tighten onto a tool shank, as shown in FIG. 9, the nut is urged rearward up jaw threads 44, thereby pushing the nut against inner race 72, bearing elements 76, outer race 78a and thrust ring 46. The rearward force creates a frictional lock between the nut and inner race 72 that further rotationally fixes two components. Additionally, the rearward force increases the frictional forces between the rear surface of outer race 78a and first surface 47 of ledge portion 50, in a direction opposite to the direction that sleeve 18 and nut 16 are being rotated. Eventually, the frictional forces restrain rotation of outer race 78a with respect to body 14. Bearing balls 76, however, permit sleeve 18 and nut 16 to continue to rotate relative to body 14 and outer race 78a in closing direction 90.

The wedge between the nut threads and jaw threads 44 increasingly resists the nut's rotation. When the operator continues to rotate sleeve 18, and the resistance overcomes the hold provided by tabs 98 in recesses 100, sleeve 18 rotates with respect to nut 16 and inner bearing race 72. This moves drive dogs 64 from sides 110 of grooves 62 to sides 108 and pushes tabs 98 out of recesses 100 into recesses 102. Simultaneously, cam surfaces 106 rotate away from tabs 96 so that the tabs are released into recesses 104, thereby engaging distal ends 88 of pawls 86 with ratchet teeth 84, as shown in FIG. 11B. At this point, inner race 72, and therefore nut 16, is rotationally locked to outer race 78a, and therefore body 14, against rotation in the chuck's opening direction. That is, the nut is rotationally locked to the chuck body in the opening direction. Since the nut's rotation with respect to the body is necessary to open the chuck, this prevents inadvertent opening during use.

Inner race 72, and therefore nut 16, may, however, still rotate with respect to outer race 78a, and therefore body 14, in the chuck's closing direction. During such rotation, sleeve 18 drives nut 16 through drive dogs 64 against groove sides 108, as well as through inner race 72. This continues to tighten the chuck and, as described above, produces a clicking sound to notify the operator that the chuck is in a fully tightened position.

To open the chuck, the operator rotates sleeve 18 in the opposite direction. Sleeve 18 transfers this torque to inner race 72 at the engagement of tabs 96 and 98 in recesses 104 and 102, respectively. Because pawls 86 engage outer race 78a, which is rotationally fixed to the body by frictional force, through the ratchet teeth, the inner race cannot rotate with the sleeve. Thus, upon application of sufficient torque in the opening direction, sleeve 18 moves with respect to the inner race and the nut. This moves tabs 96 back up onto cam surfaces 106, thereby disengaging pawls 86 from ratchet teeth 84. Tabs 98 move from recesses 102 into recesses 100, and drive dogs 64 move from sides 108 to sides 110 of grooves 62. Thus, the sleeve moves to its first position with respect to the nut, as shown in FIG. 11C, and the inner race and nut, are free to rotate with respect to outer race 78a and chuck body. Accordingly, further rotation of sleeve 18 in the opening direction moves tool engaging surfaces 43 of jaws 22 away from the chuck axis, thereby opening the chuck. As well, as nut 16 is rotated in the opening direction and rearward force on jaws 22 is relieved, the frictional forces locking outer race 78a to first surface 47 are reduced to the point that outer race 78a is free to rotate about the chuck's body.

In an alternate embodiment of the chuck, inner periphery 81 of outer race 78a and second surface 49 of ledge portion 50 are sized such that outer race 78a is received about body in a press-fit. This embodiment functions in a manner similar to that shown in FIG. 4, and previously described. As such, a description of the operation is not repeated here.

Figure 13:
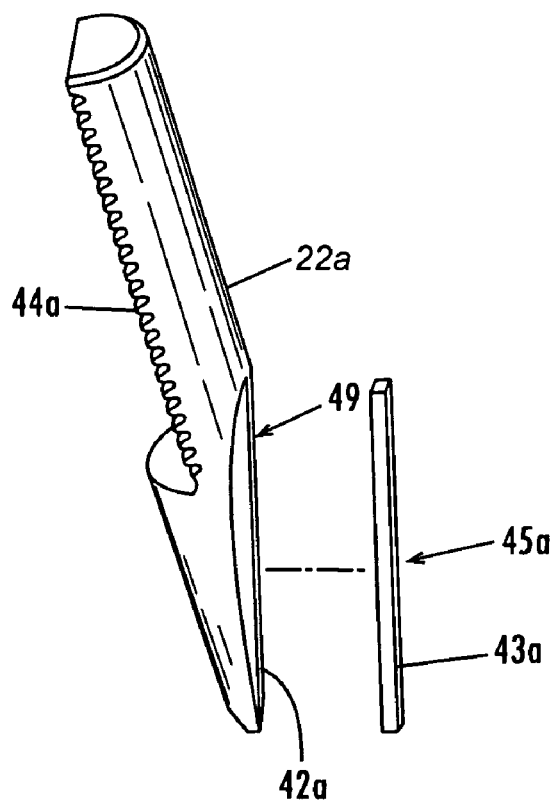
FIG. 13 is an alternate embodiment of a jaw chuck in accordance with the present invention.

While one or more preferred embodiments of the present invention have been described above, it should be understood that any and all equivalent realizations of the present invention are included within the scope and spirit thereof. Thus, the depicted embodiment(s) are presented by way of example only and are not intended as limitations on the present invention. For example, an alternate embodiment of the present invention is shown in FIG. 13, in which a jaw 22a includes a ridge 45a with a tool engaging surface 43a, wherein ridge 45a is received in a groove 49 formed in the face of jaw 22a. Ridge 45a can be retained therein by crimping, staking, soldering, etc. An additional alternate embodiment can include a ridge that extends along the jaw face and that is substantially parallel to the longitudinal center axis of the chuck, yet is not symmetric about a central symmetry plane of the jaw. As such, this embodiment has a tool engaging surface that is not symmetric about the central symmetry plane of the jaw. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A jaw for use in securing a shank of a tool in a drill chuck having a longitudinal center axis, comprising:
  a body including a jaw face formed on an inner surface of the body and a plurality of teeth formed on an outer surface of the body, the jaw face being substantially planar and parallel to the longitudinal center axis; and
  a ridge depending inwardly from the jaw face toward the longitudinal center axis, the ridge including a tool engaging surface that is substantially planar and parallel to both the jaw face and the longitudinal center axis and has a width of between 0.020 to 0.060 inches,
  wherein only the tool engaging surface engages the shank of the tool when the tool is secured in the chuck.

2. The jaw of claim 1, wherein the tool engaging surface of the ridge is symmetric about a central symmetry plane of the jaw.

3. The jaw of claim 2, wherein the tool engaging surface is transverse to the central symmetry plane of the jaw.

4. The jaw of claim 1, wherein the width of the tool engaging surface of the ridge is between 0.020 and 0.040 inches.

5. The jaw of claim 1, wherein the width of the tool engaging surface of the ridge is approximately 0.032 inches.

6. The jaw of claim 1, wherein the jaw face defines a groove that is parallel to the longitudinal center axis of the chuck, the groove being configured to receive an insert that comprises the ridge and the tool engaging surface.

7. The jaw of claim 1, wherein the chuck is configured to receive a drill bit with a shank having a maximum diameter of one-quarter inch.

8. A jaw for use in securing a shank of a tool in a drill chuck having a longitudinal center axis, comprising:
  a body including a jaw face formed on an inner surface of the body and a plurality of teeth formed on an outer surface of the body, the jaw face being substantially planar and parallel to the longitudinal center axis; and
  a ridge depending inwardly from the jaw face toward the longitudinal center axis, the ridge including a tool engaging surface that is planar and is parallel to both the jaw face and the longitudinal center axis,
  wherein only the tool engaging surface engages the shank of the tool when the tool is secured in the chuck.

9. The jaw of claim 8, wherein the tool engaging surface of the ridge is symmetric about a central symmetry plane of the jaw.

10. The jaw of claim 9, wherein the tool engaging surface has a width of between 0.020 and 0.060 inches.

11. The jaw of claim 8, wherein a width of the tool engaging surface of the ridge is between 0.020 and 0.040 inches.

12. The jaw of claim 8, wherein a width of the tool engaging surface of the ridge is approximately 0.032 inches.

13. The jaw of claim 8, wherein the jaw face defines a groove that is parallel to the longitudinal center axis of the chuck, the groove being configured to receive an insert that comprises the ridge and the tool engaging surface.

14. The jaw of claim 8, wherein the chuck is configured to receive a drill bit with a shank having a maximum diameter of one-quarter inch.

15. The jaw of claim 14, wherein the shank of the drill bit has a polygonal cross section and the tool engaging face of the chuck is configured to abut a sidewall of the shank.

* * * * *

UNITED STATES PATENT AND TRADEMARK OFFICE
CERTIFICATE OF CORRECTION

| | | |
|---|---|---|
| PATENT NO. | : 8,376,371 B2 | Page 1 of 1 |
| APPLICATION NO. | : 12/212138 | |
| DATED | : February 19, 2013 | |
| INVENTOR(S) | : Young et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this
Sixteenth Day of December, 2014

Michelle K. Lee
*Deputy Director of the United States Patent and Trademark Office*